United States Patent [19]
Alheritiere et al.

[11] 3,761,521
[45] Sept. 25, 1973

[54] HYDROGENATION OF AROMATIC NITRO COMPOUNDS

[75] Inventors: Louis Alheritiere; Georges Gobron; Claude Falize; Jean Diet; Bernard Roux; Roland Bouchet, all of Melle, France

[73] Assignee: Melle-Bezons, Melle, France

[22] Filed: Oct. 16, 1969

[21] Appl. No.: 867,037

[30] Foreign Application Priority Data
Oct. 17, 1968 France .................................. 68497

[52] U.S. Cl. .................... 260/580, 23/285, 260/460, 260/484 A, 260/583 R, 260/583 K, 260/602, 260/639 R, 260/690

[51] Int. Cl. ...................... C07c 85/10, C07c 85/12

[58] Field of Search ..................................... 260/580

[56] References Cited
UNITED STATES PATENTS
3,546,296    12/1970    Gobron et al. ...................... 260/580

Primary Examiner—Lewis Gotts
Assistant Examiner—Richard L. Raymond
Attorney—Brooks, Haidt & Haffner

[57] ABSTRACT

Process and apparatus for carrying out continuous chemical reactions, for example the hydrogenation of aromatic nitro compounds to aromatic amines, without the use of pumps and filters in which circulation is effected by control of the specific weights of various components as they circulate through the apparatus.

3 Claims, 5 Drawing Figures

HYDROGENATION OF AROMATIC NITRO COMPOUNDS

RELATED APPLICATION

U.S. Application Ser. No. 621,881, filed March 9, 1967, now U.S. Pat. No. 3,546,296, describes a somewhat similar procedure.

BACKGROUND OF INVENTION

This invention relates to processes for carrying out chemical reactions without the aid of auxiliary power such as pumps for circulating the components in the reaction mixture. More specifically it relates to processes for carrying out chemical reactions in a liquid medium in which there are dispersed a gaseous phase and a second solid or liquid phase. The gaseous and solid or liquid phases are substantially insoluble in the liquid medium and the specific weight of the solid or liquid phase is relatively high compared to the liquid medium. Still more specifically the invention relates to an improved continuous process in which a reaction mixture comprising a liquid medium, a gaseous phase and a second phase which may be either solid or liquid is circulated in a closed system without pumps, some of the liquid medium is continuously withdrawn from the reaction mixture and substantially the whole of the second phase remaining after separation of the liquid medium is returned to the reaction mixture. The invention is concerned also with novel apparatus suitable for carrying out the process.

In conventional industrial procedures for carrying out reactions of the type with which this invention is concerned, for example, catalytic hydrogenations, the liquid medium containing the second phase (generally a solid catalyst) is separated from the main reaction vessel or stream and filtered or allowed to settle and the catalyst sludge is reintroduced to the reaction mixture in the reaction vessel by means of pumps. This technique gives rise to mechanical problems which are difficult to solve. These problems include, for example, clogging of the release valves, physical degradation of the catalyst grains and physical degradation of the pumps by clogging or abrasion.

In still another conventional technique, the liquid medium containing the second phase is withdrawn from the reaction mixture and passed through a device comprising a pump and a filter. To avoid clogging the filter, clear liquid is periodically passed back through the filter in the direction opposite to the main stream. This procedure, however, merely delays the clogging of the filter, especially if the dispersed catalyst is a solid in the form of very fine particles.

Neither circulating pumps nor filters are used in the practice of this invention. The use of the invention, therefore, avoids the above mentioned inconveniences even when operating under high pressure.

THE INVENTION

In accordance with the presently preferred procedure for carrying out the present invention, a reaction mixture is continuously formed in a reaction zone or vessel by continuously mixing a gaseous phase and a second solid or liquid phase into a liquid medium in such manner that the gas or vapor is rapidly dispersed or emulsified throughout the liquid medium containing the second phase. This procedure has the effect of decreasing the specific weight of the mixture, and this causes it to rise in the reaction vessel. A portion of the reaction mixture is withdrawn from a point in the upper part of the mixture. This withdrawn portion contains some of the second phase, but it has become free from the major part of the gaseous or vapor phase. The withdrawn portion is separated in a decantation zone which is located at substantially the same level as the withdrawal point to form an upper fraction which contains reaction product but is substantially free of the gaseous and second phases, and a second or lower fraction. The latter may be comprised almost wholly of the second phase, but will ordinarily contain at least a small proportion of the liquid medium.

The reaction products are separated from the upper fraction. The lower fraction which has a comparatively high specific weight is returned to the lower part of the reaction mixture or bath. The return is spontaneous and is effected without pumps because of the comparatively high specific weight of the lower fraction.

A feature of this invention is the spontaneous circulation of a mixture which comprises a reaction mixture caused to have a relatively low specific weight because of the rapidly dispersed gaseous phase and of a second or lower fraction comprising the second phase, caused to have a relatively high specific weight by the removal of the gaseous phase and of the liquid medium and the resulting concentration of the second phase, through a cycle which comprises the upper portion of the reaction mixture, the upper portion of the decantation mixture, the lower portion of the decantation mixture and the lower portion of the reaction mixture.

For convenience, some of the terms used throughout this specification and claims will now be defined :

Reaction zone is the container or vessel in which the reaction mixture is formed and in which most of the reaction takes place.

Reaction mixture is the mixture which comprises the liquid medium, the gaseous phase and the second phase. There is a void space in the reaction zone above the reaction mixture, and this normally contains a high proportion of the gaseous phase which is used in excess and separates from the reaction mixture. Principally because of the rate at which the gaseous phase separates from the reaction mixture, the upper portion of the mixture contains a relatively low concentration of gas or vapor.

The liquid medium forms the major portion of the reaction mixture. It may itself be a reactant or it may be a solvent in which one or more of the reactants are soluble. It may be an inert liquid used merely as a carrier or it may be a mixture of reactants and solvent or of reactants, solvent and inert diluent.

The second phase is a phase which is substantially insoluble in the liquid medium. It has a high specific gravity compared to the liquid medium. Physically it may be solid or liquid. Chemically it may be a reactant, or a mixture of one or more reactants. It may also be inert or a mixture of inert and reactive materials. Most often it will be a solid catalyst.

The gaseous phase may be a reactant, for example, hydrogen in a hydrogenation reaction, or an inert gas such as nitrogen introduced to reduce the specific weight of the liquid medium. It may be a liquid reactant or an inert liquid introduced in the vapor phase. In any event it does not substantially dissolve in the reaction mixture.

The decantation zone is the zone in which the portion of the reaction mixture which is withdrawn from the upper part thereof is separated into an upper fraction from which most of the gaseous phase and second phase have been removed, and a lower fraction comprising the second phase or concentrated second phase.

In French Pat. No. 1,482,056, British Specification No. 1,152,766 and in the above identified U.S. patent application methods and apparatus are disclosed for carrying out chemical reactions such as hydrogenation reactions in which there is circulation without pumps or filters between a reaction mixture containing suspended catalyst in a reaction zone through which a gaseous phase is passed and a decantation zone where a portion of the reaction mixture containing dissolved product is separated into a top fraction and a lower fraction containing catalyst. The latter is returned to the lower part of the reaction mixture. The specific weight of the lower fraction is higher than that of the reaction mixture. In accordance with the procedures described therein it was believed that it was necessary for the reaction bath or mixture to have a high height to diameter ratio. In the case of reaction zones the cross-section of which was substantially constant, such as cylindrical vessels, the ratio was at least 5:1 and could be as high as 200:3, so that there would be a sufficient difference in head between the upper and lower portions of the system. Furthermore, it was believed that the void space above the reaction mixture in the reaction zone should be of sufficient height so that the part of the reaction mixture which was entrained in the gaseous stream would have time to form into small drops and fall back into the reaction zone. The height of the free space was generally of the same order of magnitude as that of the reaction bath itself. Normally the height to diameter ratio of the reaction zone was at least 10:1 and often higher so that for many operations the vertical height of the reaction zone could be as much as 20 meters.

It has now been found that it is not necessary to resort to such high ratios for the reaction bath and the reaction zone, but that circulation can be achieved from reaction zones of comparatively low height to diameter ratios provided that there is a rapid and intimate dispersion of gas or vapor phase throughout the reaction mixture. Accordingly, it has been found that the expense and inconvenience of exceedingly high reaction vessels can be avoided and that reaction vessels in which the height to diameter ratio is only up to about 3:1 instead of the normally employed ratio of 10:1, can be utilized. In such vessels the height to diameter ratio of the reaction mixture is from about 0.5:1 to about 2:1, and the height to diameter ratio of the void space is generally not above about 1:1. These ratios are for reaction vessels which are substantially cylindrical. It will be appreciated, however, that the novel process is not limited to reactors of cylindrical shape, but that reactors of other shapes having analogous ratios can be employed. These too are within the scope of the invention.

This is a most surprising development. It appears from a consideration of the above identified patents and patent application that circulation without pumps is dependent in large measure on the attainment of a sufficient liquid head above the bottom of the apparatus. For this reason reaction zones of immense height were designed to ensure the power necessary to circulate the reaction mixture and catalyst throughout the system.

Surprisingly it has been found that the high liquid head is not essential, and that all of the power necessary to achieve pumpless circulation can be achieved by rapidly ensuring a relatively great difference between the specific weight of the mixture in the reaction zone and that in the decantation zone. Such differences are attained in the preferred practice of this invention by providing mechanical means to ensure rapid and intimate dispersion or emulsification of the gaseous phase throughout the reaction mixture. As a result of this discovery a large number of industrial processes can be carried out efficiently without pumps or filters in reaction vessels of relatively small size.

In carrying out the invention it is preferred that the various components be introduced into the reaction mixture in the lower part of the reaction zone. The reaction zone or vessel should include a device at or near the bottom capable of rapidly and intimately dispersing the gas or vapor phase throughout the reaction mixture. The device may be, for example, a perforated plate through which the gas is passed. Rotating stirrers, especially turbine stirrers, or other devices capable of effecting the desired result can be employed.

In many instances the reaction vessel will be equipped with temperature control means such as tubes for heating or cooling the reaction mixture. It may also be equipped with means for maintaining the reaction mixture under pressure.

In the decantation zone the upper fraction may be withdrawn through overflow or similar procedure. A simple pipe, which may be equipped with a control valve, connecting the bottom of this zone with the bottom of the reaction vessel will serve as the conduit for recirculation of the bottom fraction containing the second phase.

As pointed out above, a particular advantage of this invention, in addition to the savings attributed to the use of smaller equipment, is that the recycle to the reaction vessel of the second phase which, when the second phase is a solid (this being the most frequent occurrence), is ordinarily in the form of a sludge in admixture with a portion of the reaction mixture remaining in the lower part of the decantation zone, is effected as a result of circulation power developed by the difference in specific weight of the reaction mixture in the reaction zone and the lower fraction in the decantation zone, without the use of circulation pumps or filters.

The process of this invention is applicable to a wide variety of chemical reactions of the type which may be generally described as being carried out in a liquid medium in the presence of a heterogeneous second phase which may be solid or liquid and is dispersed throughout and suspended in the liquid reaction mixture. These reactions may include, more specifically:

a. gaseous or vaporous reactants together with a liquid additional reactant and a liquid medium which may be a diluent or a solvent, for example, hydrogenation or oxidation reactions in the presence of a particulate solid catalyst;

b. one or more reactants and possibly a diluent or solvent all of which are liquid under the reaction conditions together with a reaction inert gas which functions to lower the specific weight of the reaction mixture; or as an alternative, one or more of the reactants, diluents or solvents can be introduced into and through the reaction mixture in the gaseous form. This technique is especially useful in carrying out reactions utilizing reactants which are liquid under the operating conditions and include, for example, esterifications, ester hydrolysis and dehydration of alcohols to form ethers. Such reactions are often carried out in the presence of ion exchange resins. It is also useful for effecting ion exchange reactions utilizing appropriate resins;

c. reactions in a liquid medium including one or more reactants which may be liquid or gaseous as in instances a and b above and possibly a liquid diluent or solvent in the presence of a liquid catalyst which is not totally miscible with the other substances in the reaction mixture, for example, the absorption reaction of olefins in aqueous sulfuric acid to hydrate them to alcohols.

The reaction and decantation systems may be used singly or in series. With very rapid reactions such as zero order reactions, for example, the hydrogenation of nitro compounds to form amines, a single reaction and decantation unit is normally sufficient for obtaining reaction products containing less than 100 parts per million of unconverted reactants.

For slower reactions, for example hydrogenation of nitriles or imines to form amines, hydrogenation of aldehydes or ketones to form alcohols or hydrogenation of olefins to increase the degree of saturation, it may be advantageous to use two or more reaction-decantation units arranged in series. Each combination in the series may be operated under different reaction conditions so as to attain a desired conversion rate. This aspect of the invention is explained in more detail below, and particularly illustrated in Examples 3, 4 and 5. It will be understood that the principles of the invention are applicable mutatis mutandis to combinations of several units.

The invention will be better understood by reference to the attached drawings illustrating various forms of the invention.

Figure 1:
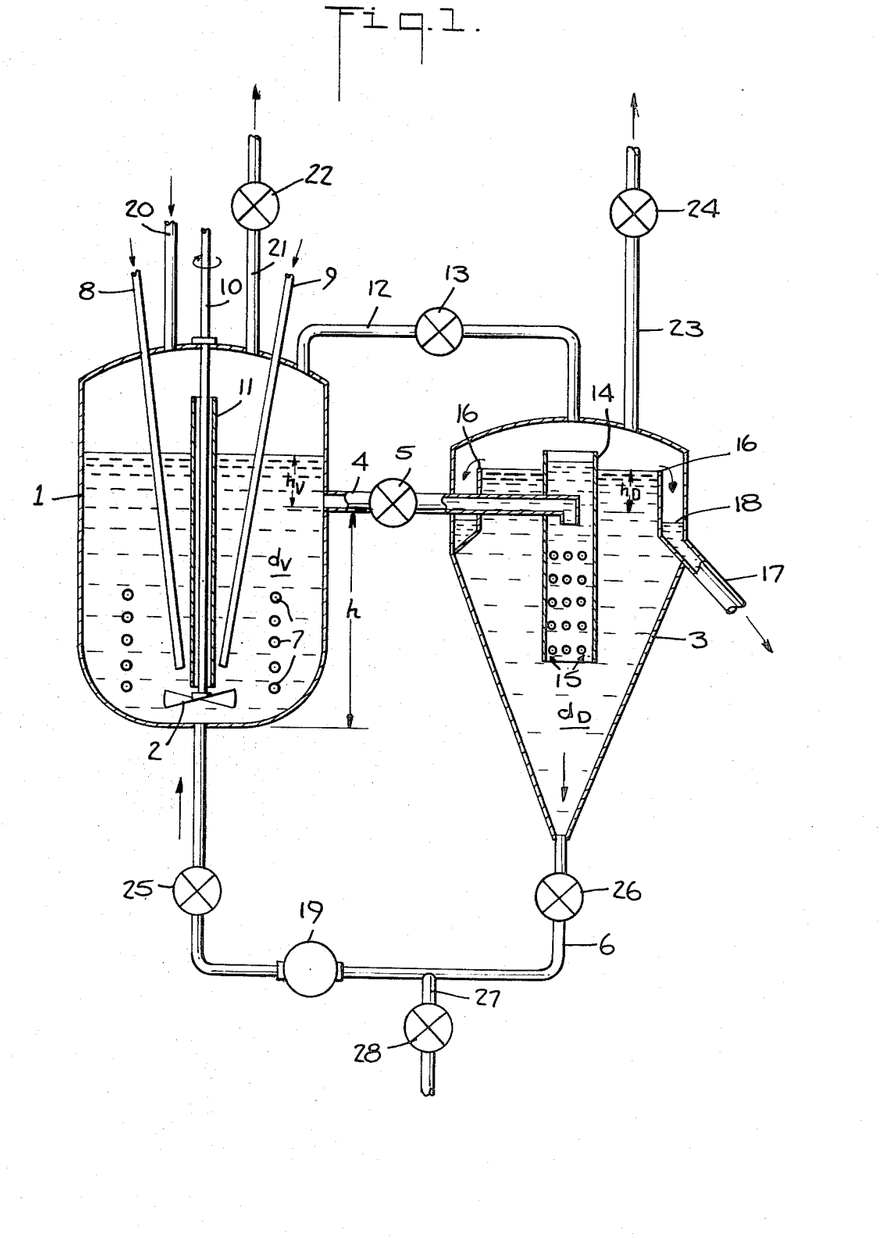

In the apparatus illustrated in FIG. 1, reaction vessel 1 is a cylindrical vat provided with a stirring device which is represented here in the form of a rotating turbine stirrer 2, the axis of which is preferably vertical. The reaction vessel is attached to a decanting device 3 in which the portion of the reaction mixture withdrawn from the upper part thereof and containing some second phase is separated into an upper and lower fraction. The attachment is through a substantially horizontal pipe 4 provided with a valve 5. The withdrawn mixture is permitted to stand in the decanter in a substantially quiet state to permit the two fractions to separate.

As explained above, natural circulation establishes itself, due to the difference in the specific weight, from the reaction mixture in vessel 1 to decanter 3 through pipe 4 and from the lower fraction in decanter 3 enriched in the second heterogeneous phase through pipe 6 back to the lower part of reaction vessel 1. This difference may be represented by $d_D - d_V$ where $d_D$ is the specific weight of the mixture in the decanter and $d_V$ is the specific weight of the reaction mixture in the reaction vessel. The rate of circulation through pipe 6 is an increasing function of $d_D - d_V$ and of the height $h$, which separates the bottom of vessel 1 from pipe 4. In operation this rate is substantially constant. The rate may be most conveniently changed by changing the diameter of pipe 6 and thus the loss of head in the pipe. The value $d_D - d_V$ will remain constant for a given reaction mixture and stirring rate.

Preferably the reaction vessel is equipped with a heating or cooling device represented in FIG. 1 in the form of a coil 7 shown in section for circulating heating or cooling fluids.

The liquid and, if desired, the gaseous substances are introduced through pipes 8 and 9 which conveniently extend close to the bottom of the reaction mixture and open near stirrer 2. The stirrer is of sufficient capacity to ensure rapid and efficient dispersion of the gaseous phase in the reaction mixture as well as good suspension of the heterogeneous second phase. The stirring device illustrated in the drawing is a turbine stirrer of a known type with a concentric tube 11 surrounding and spaced from the shaft 10. The lower end of the tube opens in an area of the reaction mixture which is close to the suction of the turbine and its upper end opens in the void space above the reaction mixture which will contain some of the gas which passes through the mixture. This arrangement of stirrer and tube permits continuous recycling of the gaseous phase back into the reaction mixture after separation therefrom and limits the importance of the vortex. It should be noted, however, that other systems capable of effecting good emulsion may also be utilized.

In FIG. 1, decanter 3 is illustrated in its preferred cylindro-conical shape. The choice of the vertex of the cone depends upon the type and size of the suspended second phase. In the instance where the second phase is a solid it should be small enough to avoid deposition of the solid particles on the walls of the decanter. Normally the vertex of the cone will be in the range of from about 15° to 60°.

The decantation zone is maintained in vapor pressure equilibrium with the reaction zone through pipe 12 provided with valve 13.

The mixture fed to decanter 3 from vessel 1 enters the decanter through pipe 4 at a point which is at substantially the same level as its withdrawal. The feed to the decanter is preferably downwards as illustrated in FIG. 1 into axial chimney 14 through an elbow in pipe 4. The chimney functions as a degassing bottle. Its upper end opens into the gaseous phase surmounting the mixture in the decanter. Its lower end opens into the conical portion of the decanter. The lower portion of chimney 14 is provided with holes or slots 15. The larger particles of the second phase which are in a suspended state in the mixture in the decanter fall through the chimney to the bottom of the cone, while the finer particles enter the annular zone which surrounds the chimney through the holes or slots 15.

The decanted liquid comprising the upper fraction of the withdrawn portion of the reaction mixture is in the upper end of this annular zone and overflows the circular threshold 16 which is provided with vertical slots for passage of the liquid. The lower ends of these slots are in a horizontal plane. The overflow liquid collects in channel 18 from which it is collected through depending pipe 17.

As has been said above, the loss of head in pipe 6 is a function of $h$ and $d_D - d_V$. Because of the presence of the gas-liquid emulsion in vessel 1, $d_D$ may be materially above $d_V$, and this depends upon the efficiency of the emulsification or dispersion means, i.e., the stirrer. This difference may be quite large, and as a general rule the efficiency of the process increases with increasing absolute values of the difference. Experience has shown that it should be at least 0.15, and that the ratio of specific weights of the mixture in the decanter to the reaction mixture in the reaction zone should be at least 1.15:1.

The apparatus is designed so that the liquid level in the reaction vessel is slightly above the liquid level in the decanter, the absolute value of the difference in levels depends upon the overflow threshold 16. The loss of head in pipe 4 is negligible. In a normal run the following equation should be satisfied :

$$h_V d_V = h_D d_D$$

where $d_V$ and $d_D$ are as defined above, and $h_V$ and $h_D$ are respectively, the heights of the liquid level in vessel 1 and of the liquid level in decanter 3 above the flowing level in pipe 4 as illustrated in the drawing.

Equilibrium pipe 12 is selected to have a sufficiently large diameter so that the loss of head caused by return of gas escaping from chimney 14 to reaction vessel 1 is negligible.

The rate of recirculation through pipe 6, and thus most conveniently the diameter of pipe 6, should be selected so that the returning fluid, especially when it contains a solid second phase is sufficiently fluid for satisfactory flow. The rate, however, should not be so high that it interferes with satisfactory decantation. The operation is normally most satisfactory if the volume of fluid mixture returning to the reaction mixture is from about two to 20 times the volume of clear liquid withdrawn through pipe 17. Appreciable variation from this range can be tolerated without undue loss of efficiency. For any given system, the optimum recirculation rate can be readily determined by observation. Any conventional device represented here by 19 can be used to measure the recirculation rate.

In certain instances optimum overall control can be achieved by withdrawing a portion of the recirculating mixture through pipe 27 fitted with valve 28.

When desired, the reaction can be carried out under increased pressure, and this may be achieved by forcing gas under pressure through pipe 20. This pipe may also be employed in lieu of pipes 8 or 9 to introduce the gaseous phase into the reaction zone. In that case the gaseous phase is intimately dispersed in the reaction mixture through tube 11 only.

Fresh liquids may also be introduced into the reaction mixture through tube 11 provided that the feeding pipe or pipes, such as 8 or 9 open into the upper end of tube 11.

Gas withdrawal from the system is provided through pipe 21 fitted with valve 22 or through pipe 23 fitted with valve 24 at the upper part of the reaction and decantation zones, respectively.

During down time, when the stirring is stopped and the circulation ceases, deposits of solid second phase from the decanter could build up in pipe 6 and prevent circulation when an attempt is made to reactivate the system. For this reason pipe 6 is provided with shut off valves 25 and 26 which are shut off during down time to prevent obstruction of pipe 6. At reactivation, the solid second phase in the decanter may be resuspended by any suitable means. For example, a small stirrer may be employed, or an inert gas may be bubbled through the mixture in the decanter. Devices for accomplishing this are conventional and are not illustrated in the drawings.

Various modifications can be made in the system illustrated in FIG. 1. For example, chimney 14 may be arranged laterally instead of axially, and the peripheral circular overflow may be replaced with a more localized conduit preferably situated at a point opposite the point in the lateral chimney through which the decanter is fed.

In the apparatus illustrated in FIG. 2 there are disposed in a single structure 29 the reaction zone 30 corresponding to vessel 1 of FIG. 1 and, surrounding this zone, a concentric, annular decantation zone 31 corresponding to zone 3 of FIG. 1. The decantation zone receives the overflow liquid from zone 30 which contains the second phase in suspended form. The overflow or withdrawn portion separates in decantation zone 31 into an upper fraction and a lower fraction containing principally the second phase. The upper fraction which is substantially free of the second phase is withdrawn from the upper part of the decantation zone. The lower fraction collects in the lower portion of the decantation zone and is automatically recirculated to zone 30 due to the difference in specific weight between it and the reaction mixture in zone 30 in accordance with the principles explained above.

Figure 2A:
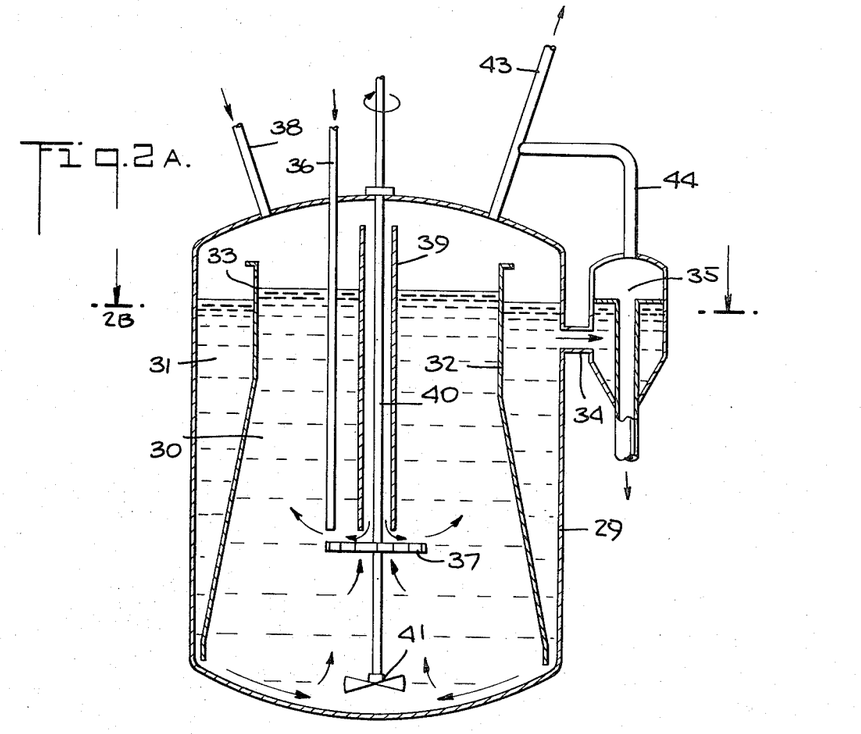
Figure 2B:
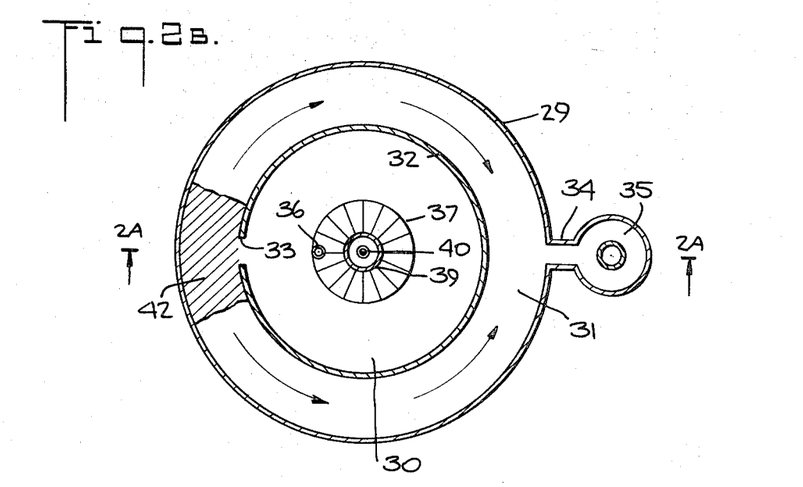

In FIG. 2, scheme A is a vertical section of the apparatus and is taken along line A—A of scheme B. Scheme B is a horizontal section of the apparatus taken along lines B—B of scheme A.

In the structure 29, as illustrated, there is a coaxially disposed shell 32 which gradually widens downwardly so as to define reaction zone 30 on the inside and decantation zone 31 on the outside. The reaction mixture containing the second phase in a suspended state continuously passes from zone 30 to zone 31 by overflow through a notch 33 the size of the aperture of which may be controlled by any selected conventional means. The second phase separates by decantation in zone 31 and collects in the lower portion of this zone, while the liquid upper fraction containing reaction product and substantially free of second phase is continuously withdrawn from the apparatus through pipe 34 and an overflow 35.

Preferably, to avoid as far as possible the entrainment of the second phase in the liquid flowing through pipe 34, the latter is situated at a point diametrically opposite to that of overflow notch 33. The recirculation of the second phase from the lower portion of zone 31 to the lower portion of zone 30, is in the direction shown by the arrows in Scheme A, and it is effected by the suction caused by the circulation of liquid from the top of zone 30 to the top of zone 31 and from the bottom of zone 31 to the bottom of zone 30. The force which causes this circulation is generated by the difference in specific weight between the mixtures in the two zones in accordance with the principles described above.

Pipe 36 serves as a conduit for the introduction of the liquid reactant or reactants and of the diluent or solvent, if employed, into the region of turbine 37. The gas or vapor phase is introduced through pipe 38 and is drawn by suction into the reaction mixture through tube 39 arranged coaxially around shaft 40, which is preferably vertical, of turbine stirrer 37 and is rapidly and intimately dispersed or emulsified throughout the reaction mixture so as to decrease its specific weight for the purposes aforesaid. Preferably, there is provided, close to the bottom of zone 30 a small stirrer 41, also mounted on shaft 40 to enhance the recycle of the second phase coming from zone 31. The purpose of stirrer 41 is merely to keep the second phase in motion, and not to cause emulsification thereof in the reaction mixture, this latter role being that of turbine 37.

Separation of the major part of the second phase in decantation zone 31 occurs in the region of overflow notch 33 in the hatched zone 42 of Scheme B. Since the second phase returns to the reaction zone only in the region of vertical or substantially vertical walls, there is little danger that it will tend to cling to and accumulate on these walls.

The role of pipes 43 and 44 is to equalize the pressures in the atmospheres of the upper portions, structure 39 and overflow device 35. Pipe 43 may also be used for the withdrawal of the gaseous phase.

Suitable heating or cooling devices may be built into the apparatus illustrated in FIG. 2.

Figure 3:
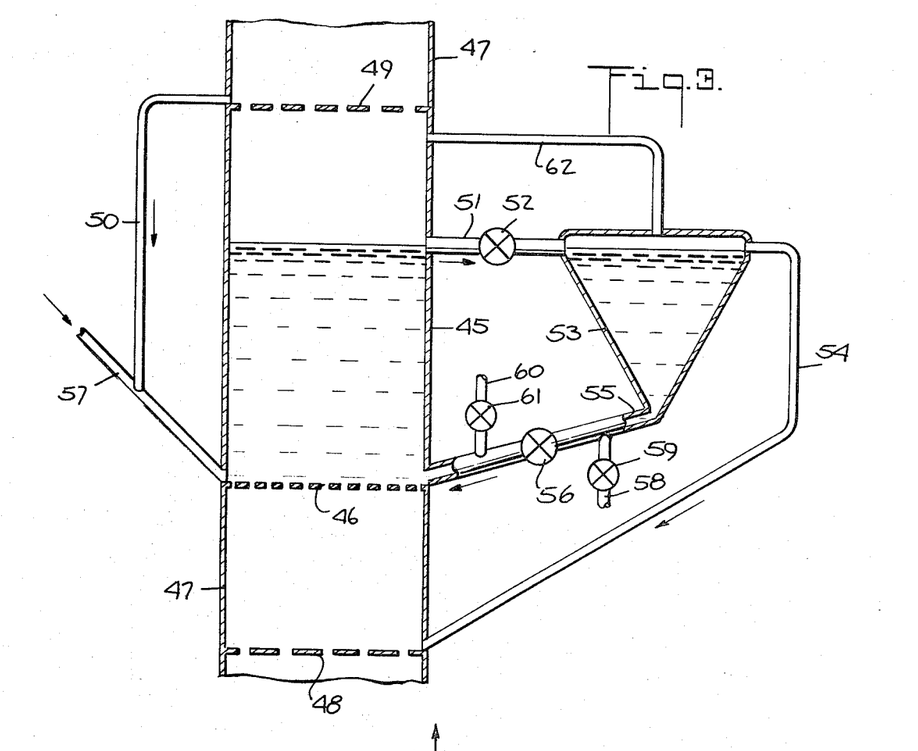

The apparatus of FIG. 3 is especially useful for reactions in which the second phase is an ion exchanger, more particularly an ion exchange resin whether it is to be used for carrying out ion exchanges with ions contained in the liquid, or as a catalyst for a chemical reaction carried out in a heterogeneous medium.

In this apparatus, the gaseous phase which is dispersed throughout the liquid contained in reactor 45 comprises one or more gases or vapors introduced into the bottom part of the reactor through perforated plate 46. The passage of the gaseous phase through the plate is sufficient to insure its emulsification in the reaction mixture. The plate thus performs the functions of the stirrers illustrated in FIGS. 1 and 2.

In the particular aspect of the invention illustrated in FIG. 3, the reaction zone 45 is part of a distillation column 47, defined by the walls of the column and a plate arranged between conventional bubbling plates 48 and 49. It is traversed upwardly by vapors coming from the lower section of the column.

A pipe 50 collects all of the liquid flowing down from plate 49, and this is fed into the reaction zone just above plate 46. The dispersion of the ion exchanger is effected by the turbulence caused by the passage of the vapors coming from plate 48. The vapors then escape from the top of the reaction mixture to plate 49, while a portion of the reaction mixture is collected through pipe 51, equipped with valve 52, in decantation zone 53.

From this decanter, the amount of liquid corresponding, per unit time, to the amount introduced into the reaction mixture through pipe 50 passes through pipe 54 to plate 48 for rectification in the lower section of column 47. This liquid, which is the upper fraction from the decantation zone, contains reaction product and is substantially free of the heterogeneous second phase. The lower fraction, containing second phase, is recycled from the lower portion of the decantation mixture to the reaction mixture through pipe 55 provided with a valve 56.

Additional reactants may be added to the reaction mixture, if necessary, through pipe 57 opening into pipe 50.

The ion exchange resin if used as a catalyst may become deactivated with the passage of time, or it may become saturated if it is used for its ion exchange capacity. In either event it is most convenient to arrange for its continuous renewal. This is conveniently accomplished, in accordance with one aspect of the invention, by continuously withdrawing a part of the ion exchanger for regeneration through pipe 58 provided with valve 59. At the same time an equivalent quantity of fresh ion exchanger is introduced to the system through pipe 60 provided with valve 61. By these means the reaction capacity of the system is constantly maintained.

Equilibrium of vapor pressures in the system is assured by pipe 62 opening into the upper portions of the decantation and reaction zones.

What has been described is a novel continuous process for carrying out chemical reactions in a liquid medium containing a gaseous and a heterogeneous liquid or solid phase in which the various components are continuously circulated throughout the reaction system without the aid of circulating pumps or filters. The reaction system comprises a reaction zone containing reaction mixture and a decantation zone, containing a decantation mixture, in which a withdrawn portion from the upper part of the reaction mixture is separated into upper and lower fractions. The system includes the various appurtenances for permitting continuous flow, maintaining vapor pressure equilibrium, introducing reactants and other components of the reaction mixture and for rapidly and intimately dispersing the gaseous phase throughout the reaction mixture. As a result of the rapid emulsification of the gaseous phase in the reaction mixture, and the separation of the heterogeneous phase from the mixture in the decantation zone there is a difference between the specific weights of the respective mixtures. This difference may be quite large, but as a practical matter is at least 0.15, so that the ratio of the mixture in the decantation zone to the reaction mixture in the reaction zone is at least 1.15.:1.

A special feature of the invention is that as a result of introducing means for rapidly and intimately dispersing the gaseous phase in the reaction mixture the relatively low specific weight of this mixture is rapidly attained and maintained. This surprisingly makes it possible to use reaction zones or vessels in which the height to diameter ratio is very low and normally is no higher than 3:1. This avoids one of the difficulties of prior art procedures which was that, in order to maintain what was believed to be a necessary liquid head, the reaction zones were inordinately high ... often as high as 20 meters.

The following examples are given by way of illustration only and are not intended as limitations of this invention since many apparent variations are possible without departing from the spirit or scope thereof.

EXAMPLE 1

This example illustrates the hydrogenation of dinitro toluenes to the corresponding toluylene diamines. Here, a mixture of the isomeric 2,4 and 2,6-dinitro toluenes is subjected to hydrogenation. As the various isomeric dinitro toluenes have an identical behavior during their hydrogenation, it is possible to treat under the same conditions any one of these isomers, or mixtures thereof, that is to say that the exact composition of the mixture to be treated has no influence on the operation.

There is used an apparatus similar to that of FIG. 1, with the following characteristics:

Vessel 1:
Materials: ordinary steel
Internal Diameter: 1600 millimeters
Total height: 2.8 meters Height of the catalytic bath in the vessel during operation: 2 meters
Volume of the bath during operation: 3200 liters
Overflow level through pipe 4 (height $h$): 1.8 meters
Speed of stirrer 2: 500 rpm
Volume increase of the bath during operation, with respect to the bath in quiet state: 30–35 percent
$h_V$ is 200 mm and $d_V$ is 0.695
Decanter 3:
Material: ordinary steel
Maximum internal diameter: 1,600 mm
Vertex of the cone: 30°
$h_D$ is 150 mm and $d_D$ is 0.920
The operation conditions are as follows:
Feed of dinitro toluene mixture to vessel 1 through pipe 8: 750 kg/hour
Feed of 96 percent by volume ethyl alcohol (solvent) to vessel 1 through pipe 9: 400 liters/hour
Temperature of the reaction mixture in vessel 1: maintained at 100°C. by cooling with coil 7 which is also used for heating at the starting of the operation
Hydrogen pressure (feed by pipe 20): 20–25 bar
Catalyst: reduced nickel supported on silica-base carrier (kieselguhr) in divided state
Nickel content of the reaction mixture: 20 g/liter
Flow rate of the mixture through pipe 6: 5–8 m³/hour Under these conditions, the dinitro toluene content of the raw reaction product withdrawn through pipe 17 is below 20 mg/liter and its nickel content is below 500 mg/liter.

The raw product is then subjected to conventional distillation operations, initially at atmospheric pressure and finally under vacuum, to separate from this product the water and alcohol, re-concentrate the alcohol for recycling it, and rectify the raw mixture of toluylene diamines for freeing same from by-products with low and high boiling points which were formed during the reaction.

The total yield of 2,4- and 2,6-toluylene diamines is 98 percent with respect to the dinitro toluenes converted.

EXAMPLE 2

This example illustrates the hydrogenation of mononitro benzene to aniline.

The reaction is performed in the apparatus of Example 1, the operation conditions being as follows:
Feed of mononitro benzene to the reactor: 800 kg/hour
Feed of 96 percent by volume ethyl alcohol (solvent) to the reactor: 320 liters/hour
Temperature in the reactor: 100°C.
Hydrogen pressure: 20–25 bar
Catalyst: reduced nickel supported on highly pure silica (commercial "Aerosil," Trade Mark) in divided state
Nickel content of the reaction mixture: 20 g/liter
Flow rate of the mixture through pipe 6: 6–10 m³/hour
$d_V$ is 0.693; $d_D$ is 0.915; $h_V$ is 200 mm, $h_D$ is 150 mm Under these conditions the mononitro benzene content of the raw reaction product withdrawn through pipe 17 is below 20 mg/liter and its nickel content is below 500 mg/liter.

The raw product is then distilled to recover the desired product in accordance with conventional techniques.

The aniline yield with respect to the mononitro benzene converted is about 99 percent.

EXAMPLE 3

This example illustrates the conversion of monobutylimine to monobutylamine by hydrogenation, which reaction, as is known, is carried out in the presence of ammonia to avoid formation of secondary and tertiary amines.

In this example, the apparatus comprises two groups, arranged in series and working co-currently, each of them comprising the reaction vessel-plus-decanter system represented in FIG. 1, and being made of ordinary steel. For sake of convenience, the organs or items of the first group will be designated by the reference Nos. of FIG. 1, for example: vessel 1, decanter 3, and those of the second group will be designated by the same Nos. but accompanied with a "prime" sign, for example: vessel 1', decanter 3'.

The apparatus in the two groups are maintained under a hydrogen pressure of 20 bar, the hydrogen being fed to vessel 1 through pipe 20 and to vessel 1' through pipe 20'.

Vessel 1 in the first group is fed through pipe 8 with monobutylimine containing some water and a small amount of ammonia, and through pipe 9 with liquid ammonia. The water-and ammonia-containing monobutylimine is the reaction product of butyraldehyde with ammonia after the raw reaction mixture has been decanted and the water separated by the decantation has been discarded.

Vessel 1' in the second group is fed through pipe 8' with the clear liquid withdrawn from decanter 3 of the first group through pipe 17. This liquid still contains an amount of unconverted monobutylimine the hydrogenation of which will be practically completed in the apparatus of the second group. Pipe 9' is not utilized.

Each reaction vessel has a useful capacity of 10 liters of liquid and contains 400 g of reduced nickel supported on highly pure silica (commercial " Aerosil ") in divided state. Each decanter has a useful capacity of 8 liters.

The dimensions of the items of the apparatus are as follows:
Vessels 1 and 1':
Diameter: 180 mm
Total height : 60 cm
Level of the overflows through pipes 4 and 4' (height $h$ ): 40 cm
Speed of stirrers 2 and 2' : 1,500 rpm
Decanters 3 and 3':
Maximum diameter : 180 mm
Vertex of the cone: 30°
Total height : 65 cm
Maximum height of the liquid in the decanters : 47 cm The temperature in the two reaction vessels is maintained at 125° C. by means of an external jacket through which is passed a heat exchange fluid.

In each group the flow rate of the mixture passing through pipe 6 (6') is 25 liters per hour. In each group, $h_V = 44$ mm, $d_V = 0.560$, $h_D = 34$ mm, $d_D = 0.730$, and the height of the reaction mixtures in vessels 1 and 1' is 44.4 cm.

Under these conditions, when the plant runs in equilibrium the hourly operation balance for the two groups is as follows:

First group:
Feed through pipe 8: mixture of:
| | |
|---|---|
| Monobutylimine | 6400 g |
| Water | 700 g |
| NH$_3$ | 100 g |

Feed through pipe 9:
| | |
|---|---|
| Liquid NH$_3$ | 2200 g |

Withdrawal through pipe 17:
| | |
|---|---|
| Monobutylamine | 5870 g |
| Dibutylamine | 180 g |
| Monobutylimine | 180 g |
| NH$_3$ | 2320 g |
| Nickel (fines) | 0.8 g |

Second group:
Feed through pipe 8': mixture withdrawn through pipe 17 (see above)

Withdrawal through pipe 17':
| | |
|---|---|
| Monobutylamine | 6040 g |
| Dibutylamine | 180 g |
| Monobutylimine | 10 g |
| Water | 700 g |
| NH$_3$ | 2320 g |
| Nickel (fines) | 1.2 g |

The mixture withdrawn through pipe 17' is the final raw product of the operation, from which the desired product is recovered by conventional procedures.

The total yield of monobutylamine and dibutylamine is 96.5 percent.

EXAMPLE 4

This example illustrates the hydrogenation of methylamine propionitrile, CH$_3$—NH—CH$_2$—CH$_2$—CN, to form methylamino propylamine, CH$_3$—NH—CH$_2$—CH$_2$—CH$_2$—NH$_2$. The operation is carried out in the presence of ammonia.

The apparatus used comprises two reaction-decantation elements of the kind represented in FIG. 2, arranged in series and working co-currently. These elements are made of ordinary steel and, in each reaction-decantation element, the volume occupied by the reaction mixture during the reaction is 10 liters, the diameters are 250 mm, and the heights, 30 cm.

For referencing the organs of the two devices, the same principle as in Example 3 will be resorted to.

In each of the two devices there is placed 500 g of a divided catalyst constituted by reduced nickel supported on highly pure silica (commercial "Aerosil"). The temperature is maintained at 90°C. and the pressure at 30 bar by means of hydrogen introduced by pipes 38 and 38'. The rotation speed of the stirrers (turbines 37 and 37' and screws 41 and 41') is 1,500 rpm.

There is introduced per hour into the first device 29 by pipe 36 a mixture of:
| | |
|---|---|
| Methylamine propionitrile | 2.5 kg |
| Methanol (solvent) | 6 kg |
| NH$_3$ | 3 kg |

The liquid withdrawn from device 29 through overflow device 35 is passed to the second reaction-decantation device (29') into which it is introduced through pipe 36'. From device 29' there is withdrawn through overflow device 35' a mixture of methanol, methylamino propylamine, and high boiling by-products.

After distillation by conventional techniques of the mixture so obtained, there is recovered 2,520 g of the desired diamine and 100 g of high boiling by-products.

The diamine yield is 96.3 percent.

EXAMPLE 5

This example illustrates propylene absorption in aqueous sulfuric acid. This reaction is the first stage of isopropanol manufacture from propylene, the second stage being the hydrolysis of the isopropyl sulfates obtained.

As in Example 3, two groups of apparatus are used, which are arranged in series, each group comprising a reaction vessel-plus-decanter system in accordance with FIG. 1, made of stainless steel with an inner lead lining. For referencing the organs of the two groups, the same principle as in Example 3 will be employed.

Figure 4:
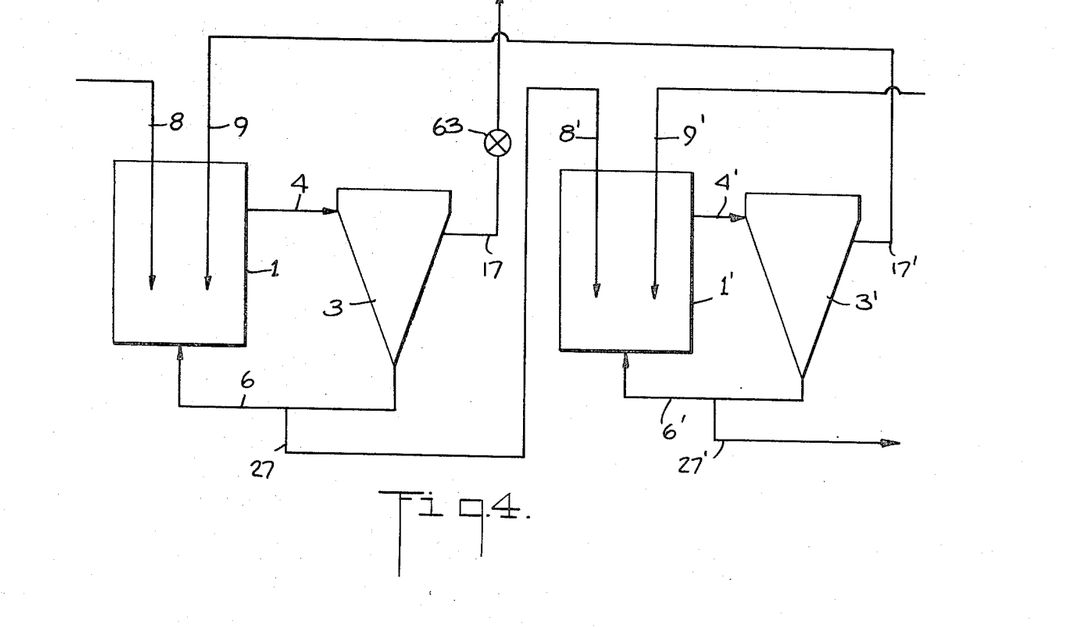

However, in contradistinction with what was done in Example 3, the reactants, namely liquid propylene and aqueous sulfuric acid, circulate through the system counter-currently to each other, the fresh liquid propylene being fed to the second group and the residual liquid propylene being removed from the first one, while the aqueous sulfuric acid is fed to the first group and the final solution of isopropyl sulfates is removed from the second one. Such an arrangement, the working mode of which is described below in a more detailed way, is schematically represented in FIG. 4.

The plant is operated under pressure to maintain a liquid propylene phase and the gaseous phase consists of part of the propylene which, formerly liquid, becomes gaseous in the apparatus.

In each of the two groups, the dimensions of the organs or items are as follows:

Vessels 1 and 1':
Diameter: 180 mm
Total height: 20 cm
Level of the overflows through pipes 4 and 4' height h): 17.5 cm
Speed of stirrers 2 and 2': 1,000 rpm
Height of reaction baths: 18.5 cm Decanters 3 and 3':
Maximum diameter: 165 mm
Vertex of the cones: 45°
Height of the cones: 20 cm
Height of the cylindrical parts above the cones: 3 cm It should be noticed that in this plant the pipes 4 and 4' are represented opening in decanters 3 and 3' at the level of the junction of the lower, conical portions with the upper, cylindrical portions of these decanters. According to the construction facilities, the pipe for entry of reaction mixture into a decanter in accordance with the invention may open either in the cylindrical portion or in the conical portion, or else at the junction of the two portions.

The starting propylene, at a purity of 98 percent (containing 2 percent by weight of propane), is continuously introduced, in liquid state, into vessel 1' through pipe 9'. Vessel 1' also receives, through pipe 8', the acid solution of isopropyl sulfates coming from the first apparatus group, which solution can still absorb further amounts of propylene.

The liquid mixture leaving vessel 1' through pipe 4' separated into two layers in decanter 3'. The upper layer is constituted by the non-absorbed portion of the starting propylene and is withdrawn through pipe 17' and sent after release to the first group, in vessel 1, through pipe 9. Vessel 1 also receives, through pipe 8, aqueous sulfuric acid containing 75 percent by weight of H$_2$SO$_4$.

The liquid mixture leaving vessel 1 through pipe 4 separates into two layers in decanter 3. The upper layer, which is constituted by residual, non-absorbed, propane-enriched propylene, is withdrawn from decanter 3, through pipe 17, in liquid state. This impure propylene may be either maintained in liquid condition to be recovered, or brought again, by release by means of a release valve 63, to gaseous state, to be burnt in this form.

There is continuously withdrawn from the first group, through pipe 27, part of the acid solution of isopropyl sulfates which is being recycled from decanter 3 to vessel 1, which part corresponds in amount to the amount of sulfuric acid introduced through pipe 8. The liquid so withdrawn is fed to reactor 1' through pipe 8'. Likewise, there is continuously withdrawn from the second group, through pipe 27', part of the solution of isopropyl sulfates which is being recycled from decanter 3' to vessel 1', which part also corresponds in amount to the amount of sulfuric acid introduced through pipe 8. This solution, which is the final raw product of the propylene absorption operation, is then sent to the isopropyl sulfate hydrolysis unit (not shown).

In this plant, working as above described, the operation is carried out by introducing, per hour, 2.5 liters of 75 percent by weight, aqueous sulfuric acid, this allowing 45 moles of propylene to be absorbed within the same time, the operation conditions being as follows:
Pressure in vessel 1: 23 bar, effective
Pressure in vessel 1': 25 bar, effective
Temperature in vessel 1: 65°C.
Temperature in vessel 1': 62°C.
$C_2H_4$ content of the impure, residual propylene removed from the first group through pipe 17: 50 percent by weight.

The isopropanol yield after the subsequent hydrolysis step is 96 percent.

EXAMPLE 6

This example illustrates a neutralization operation, by means of an ion exchanger, of an alkaline product, namely, a raw aldolization (or aldol condensation) product of acetaldehyde in the presence of sodium hydroxide in a reaction-distillation column.

The apparatus used in that of FIG. 3, comprising a reactor 45 accompanied with a decanter 53 and inserted in a column 47 in which there is performed, above reactor 45, the aldolization reaction of acetaldehyde by sodium hydroxide, in ethanol as a solvent (there is used 96 percent by volume, aqueous ethyl alcohol) and, below reactor 45, partial separation of the unconverted acetaldehyde from the raw aldolization product after neutralization thereof in reactor 45. The total height from plate 46 to plate 49 is 200 mm. The diameter is 100 mm. The diameter at the top of the decanter is 90 mm, and its height is 90 mm.

Through pipe 50 there is introduced on to perforated plate 46 a mixture of acetaldol, unconverted acetaldehyde, aqueous ethanol, and sodium hydroxide. The alkalinity of this mixture is neutralized in reactor 45 by contacting with an anion exchange resin, the stirring being ensured by bubbling of the acetaldehyde vapors coming from the lower section (acetaldehyde separation section) of the column and returning to the upper section (aldolization section).

When the anion exchanger is neutralized to an extent of about 60 percent of its ion exchange capacity, continuous withdrawal of a portion thereof through pipe 58 is started. The withdrawn portion is sent to an ion exchanger regeneration unit (not shown), while through pipe 60 there is continuously introduced an amount of fresh ion exchanger corresponding to the amount withdrawn through 58, so as to maintain constant the neutralization capacity of the ion exchanger mass contained in reactor 45 and decanter 53.

The neutralized liquid is continuously passed on to plate 48 through pipe 54 to separate part of the acetaldehyde therefrom in the lower section of the column.

EXAMPLE 7

This example illustrates the manufacture of 2-ethoxy ethyl acetate by esterification of 2-ethoxy 1-ethanol with acetic acid in the reactor of FIG. 3 inserted in column 47 and charged with an acid cation exchange resin, preferably an aryl sulfonic resin.

The reactor continuously receives, besides the liquid refluxed from plate 49 through pipe 50, a constant feed of 2-ethoxy ethanol and acetic acid through pipe 57. The amounts of reactants fed are such that the acidity of the liquid flowing through pipe 54 towards plate 48 is constant. This acidity is fixed in absolute value according to the operating temperature and the age of the ion exchanger.

The liquid which, after decantation of the catalyst in decanter 53, flows through pipe 54 contains, besides 2-ethoxy ethyl acetate, 2-ethoxy ethanol and acetic acid because only a partial conversion of the reactants in the reactor is effected.

In the lower section of column 47 the 2-ethoxy ethanol and acetic acid are separated from this liquid and are recycled to the reactor in vapor state, through perforated plate 46, while there is withdrawn from the base of the column the 2-ethoxy ethyl acetate freed from these two reactants and containing only small amounts of high boiling by-products from which it is separated in another distillation column (not shown).

In the upper section of column 47, the reaction water is separated by the conventional technique utilizing the formation of a heterogeneous azeotropic mixture of water with an auxiliary liquid, more particularly a liquid hydrocarbon such as cyclohexane, with returning of the reactants, 2-ethoxy ethanol and acetic acid, to the bottom of this section and to the reactor.

The length of active life of the ion exchangers used here as catalysts amounts to several thousands of hours. It is not necessary therefore to continuously reactivate them, so that pipes 58 and 60 are not used.

The ester yield is about 98 percent, whether calculated on the 2-ethoxy ethanol or on the acetic acid.

What is claimed is:

1. In a continuous process for hydrogenating an aromatic nitro compound to form an aromatic amine in a closed reaction system without pumps, wherein a hydrogen gaseous phase is dispersed in a liquid phase, which liquid phase contains said nitro compound and which will dissolve said amine, to suspend a particulate solid hydrogenation catalyst and form a reaction mixture, the reaction mixture being continuously formed in the lower portion of a substantially vertical reaction zone having a void space above the surface of the reaction mixture, continuously withdrawing from the upper portion of the reaction mixture a mixture containing at least part of the liquid phase, said withdrawn liquid phase containing reaction product together with at least a part of the suspended solid catalyst, conducting the withdrawn mixture into a decantation zone at a level in the decantation zone which is substantially the same as the level from which the withdrawn mixture was removed from the reaction zone, separating the withdrawn mixture into an upper fraction which contains reaction products and a lower fraction, collecting a sufficient quantity of the upper fraction to maintain a substantially constant volume of liquid in the system, and returning the lower fraction to the lower part of the reaction mixture, the improvement which comprises rapidly and intimately dispersing the gaseous phase throughout the reaction mixture so that the specific weight of the mixture in the decantation zone to the specific weight of the mixture in the reaction zone is at least 1.15:1, the height to diameter ratio of the reaction mixture in the reaction zone is about 0.5:1 to 2:1, and the height to diameter ratio of the reaction zone is up to about 3:1.

2. A process as in claim 1 wherein the reaction mixture is under pressure.

3. A process as in claim 1 wherein the volume of the lower fraction returning to the reaction mixture is from about 2 to about 20 times the volume of the upper fraction.

* * * * *